Patented Dec. 5, 1922.

1,437,636

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF CHLORINATING ORGANIC COMPOUNDS.

No Drawing.   Application filed September 24, 1919.   Serial No. 325,931.

*To all whom it may concern:*

Be it known that I, HERBERT H. Dow, a citizen of the United States, and a resident of Midland, county of Midland, and State of Michigan, have invented a new and useful Improvement in Methods of Chlorinating Organic Compounds, of which the following is a specification, the principle of the invention being herein explained and the best mode in which I have contemplated applying that principle, so as to distinguish it from other inventions.

In attempting the direct chlorination of organic compounds by the employment of active charcoal or other equivalent catalyst considerable difficulty has heretofore been encountered due to the formation of compounds of higher boiling point than the temperature of reaction. These compounds, condensing either in liquid or solid form on the charcoal, gradually render the latter inactive and so it becomes necessary to either replace such charcoal or process the same to restore its activity. I am not aware that the reason for the inactivity of the charcoal as just set forth has ever heretofore been rightly apprehended, still less so the method which I have devised for overcoming this difficulty in operations of the character in question.

The object of the present invention in other words is to maintain the charcoal or other catalyst in substantially its initial state of activity by removing the compounds which would otherwise interfere with such activity, at suitable intervals, as by intermittently subjecting the chamber in which the reaction takes place to a vacuum. To the accomplishment of the foregoing and related ends, the invention then consists of the steps hereinafter fully described and particularly pointed out in the claims, the following description setting forth but one of the several ways in which such object can be attained.

It has been known for some time that chlorides of carbon may be produced by mixing a suitable hydrocarbon gas with chlorine in the presence of a porous medium, and then bringing the mixture to the proper temperature. The medium preferably used is specially treated charcoal which need not be further described, forming as it does no part of the present invention. Such charcoal constitutes in effect a catalyst, since it apparently does not enter directly into the reaction and theoretically at least should be capable of use for an indefinite period. Nevertheless, as already indicated, in practice, it is found that such a catalyst loses its activity after a period of use, the reason for such loss having heretofore been considered more or less obscure. I have found, however, that by intermittently removing the precipitated liquid or solid products resulting from the reaction, the life of the catalyst, specifically such charcoal, may be very considerably if not indefinitely prolonged.

As a specific illustration of my improved process, I shall describe the same as applied to the chlorination of gaseous hydrocarbons of the $C_nH_{2n-2}$ series, specifically acetylene. Upon bringing chlorine in contact with acetylene in the presence of a porous catalyst, such as active charcoal, a variety of substitution or addition compounds is formed, the most conspicuous as well as the most desirable being the tetrachloride. The formation of these compounds begins at a temperature as low as from 40 to 50 degs. C., whereas the boiling point of such compounds ranges from approximately 60 to 200° C. and upwards, the boiling point of acetylene tetrachloride, for example, being approximately 140° C. It will accordingly be seen that as a result of the initial reaction taking place in such process of chlorination, compounds may be formed which will not be in vaporous state at the temperature at which such reaction occurs, and even though the temperature be subsequently raised they may still continue present in the charcoal or other equivalent porous medium to such an extent as to materially affect the activity of the same; the reaction accordingly slows down and may practically cease.

I have found, however, that if, when this resulting condition approaches an objectionable stage, the reacting elements or compounds be shut off and the reaction chamber be placed under a vacuum, i. e. if the pressure therein be reduced below atmospheric to a point where all of the products of the resulting reaction will assume a vaporous state, the products having a relatively high boiling point may be evaporated off. These products are of course withdrawn while still in such vaporous state, and may then be condensed and are separated by fractional distillation or in any other familiar way. The degree of vacuum which requires to be applied in order to secure the result stated will of course vary with the temperature, as will be readily understood.

Thereupon the reacting elements or compounds are again admitted to the chamber under previous conditions of pressure and temperature, and the charcoal resumes its catalytic functions substantially unimpaired.

It is to be understood that the catalytic charcoal apparently has the property of liquefying gases at a temperature very much above the point at which they would in a free condition be liquefied, and a moderate elevation of temperature is not sufficient to drive off a chlorinated hydrocarbon although this elevated temperature may be more than 100 degrees in excess of its boiling point when not associated with the charcoal. The present process, then, consists in combining the action of a vacuum with that of an elevated temperature whereby the chlorinated liquid is expelled from the charcoal.

The following description sets forth in detail one approved method of carrying out the invention, such disclosed mode, however, constituting but one of the various ways in which the principle of the invention may be used.

I therefore particularly point out and distinctively claim as my invention:—

1. The method of chlorinating organic compounds, which consists in alternately bringing chlorine in contact with such a compound in the presence of a suitable catalyst, and then shutting off such reacting agents from such catalyst and subjecting the latter to pressure conditions such that all the products of the resulting reaction will assume a vaporous state, substantially as described.

2. The method of chlorinating organic compounds, which consists in bringing chlorine in contact with such a compound in the presence of active charcoal, and then shutting off such reacting agents from such charcoal and subjecting the latter to pressure conditions such that all the products of the resulting reaction will assume a vaporous state, substantially as described.

3. The method of chlorinating organic compounds, which consists in alternately bringing chlorine in contact with such a compound in the presence of a suitable catalyst, and then shutting off such reacting agents from such catalyst and lowering the pressure over the latter to a point where the products of the reaction between such agents having a higher boiling point than the temperature at which such reaction occurs may be withdrawn in vaporous state.

4. The method of chlorinating organic compounds, which consists in bringing chlorine in contact with such a compound in the presence of active charcoal, and then shutting off such reacting agents from such charcoal and lowering the pressure over the latter to a point where the products of the reaction between such agents having a higher boiling point than the temperature at which such reaction occurs may be withdrawn in vaporous state.

5. The method of chlorinating hydrocarbons, which consists in bringing chlorine into contact with such hydrocarbon in the presence of a suitable catalyst, and then shutting off such reacting agents from such catalyst and lowering the pressure over the latter to a point where the products of the reaction between such agents having a higher boiling point than the temperature at which such reaction occurs may be withdrawn in vaporous state.

6. The method of chlorinating hydrocarbons of the aliphatic series, which consists in bringing chlorine into contact with such hydrocarbon in the presence of a suitable catalyst, and then shutting off such reacting agents from such catalyst and lowering the pressure over the latter to a point where the products of the reaction between such agents having a higher boiling point than the temperature at which reaction occurs may be withdrawn in vaporous state.

7. The method of chlorinating acetylene, which consists in bringing chlorine in contact therewith in the presence of a suitable catalyst, and then shutting off such reacting agents from such catalyst and lowering the pressure over the latter to a point where the products of the reaction between such agents having a higher boiling point than the temperature at which such reaction occurs may be withdrawn in vaporous state.

8. The method of chlorinating acetylene, which consists in bringing chlorine in contact therewith in the presence of active charcoal, shutting off such reacting agents from such charcoal and lowering the pressure over the latter to a point where the products of the reaction between such agents having a higher boiling point than the temperature at which such reaction occurs may be withdrawn in vaporous state, and then repeating the foregoing cycle of steps.

Signed by me this 19 day of September, 1919.

HERBERT H. DOW.